United States Patent [19]

Cornellier

[11] Patent Number: 4,597,251
[45] Date of Patent: Jul. 1, 1986

[54] LAWNMOWER

[76] Inventor: Maurice H. Cornellier, P.O. Box 4104, Dearborn, Mich. 48126

[21] Appl. No.: 729,861

[22] Filed: May 2, 1985

[51] Int. Cl.$^4$ ............................................. A01D 55/02
[52] U.S. Cl. .................................... 56/17.6; 56/17.2; 56/246; 280/43
[58] Field of Search ...................... 56/17.6, 17.4, 17.2, 56/246; 280/43, 43.22

[56] References Cited

U.S. PATENT DOCUMENTS

| 2,557,598 | 6/1951 | Daggett | 56/17.4 |
| 2,672,349 | 3/1954 | Brock | 280/43.22 |
| 2,733,565 | 2/1956 | Kearney | 56/17.6 |
| 3,043,604 | 7/1962 | Rehnberg et al. | 280/43 |
| 3,074,221 | 1/1963 | Martins | 56/17.6 |
| 4,107,906 | 8/1978 | Cousino | 56/17.6 |

FOREIGN PATENT DOCUMENTS 671157  9/1963  Canada ................................ 56/17.2

Primary Examiner—Gene Mancene
Assistant Examiner—David I. Tarnoff
Attorney, Agent, or Firm—Barnes, Kisselle, Raisch, Choate, Whittemore & Hulbert

[57] ABSTRACT

A lawnmower comprising a mower deck carried by four wheels positioned in laterally opposed pairs, with the forward wheels being adjustable for selecting mowing height. A pair of longitudinal blades are carried at the forward edge of the deck and have respective arrays of blade teeth projecting forwardly of the deck. The lower blade is affixed to the deck and the upper blade is coupled by a bell crank and a pitman drive to the output shaft of an engine for reciprocating the upper blade over the lower blade and thereby scissoring the respective blade teeth arrays. A guard shell is carried by the mower deck enclosing the mower blades and has vertical slots in the forward shell wall for receiving and combing grass to positions among the mower blade teeth. A blower is coupled to the shell for assisting such combing action and for removing clippings from the shell enclosure. The shell slots are dimensioned to prevent entry of rocks, tree trunks and human limbs.

12 Claims, 9 Drawing Figures

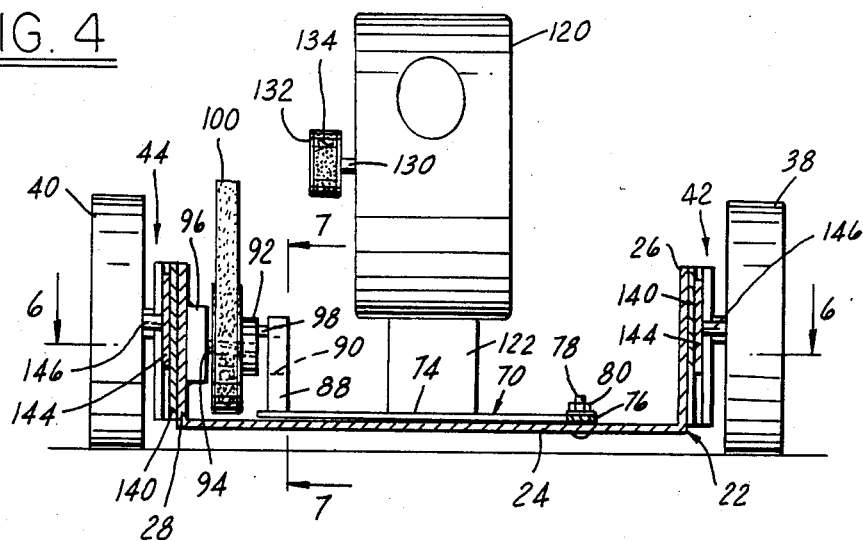
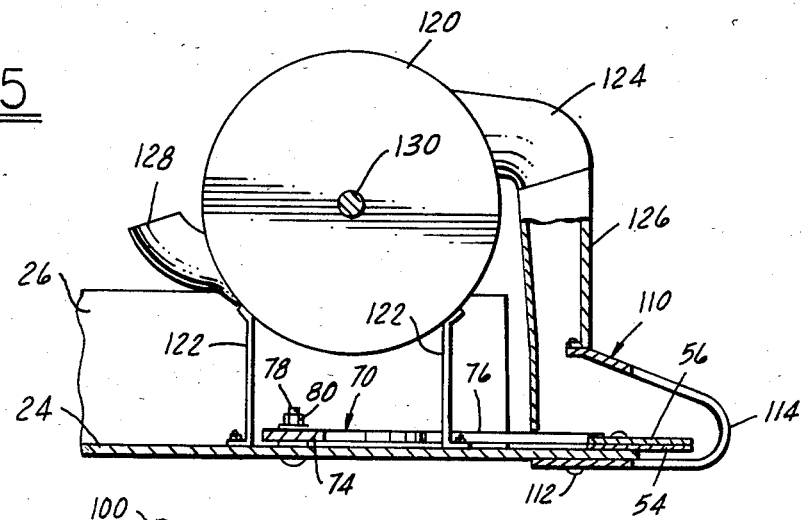
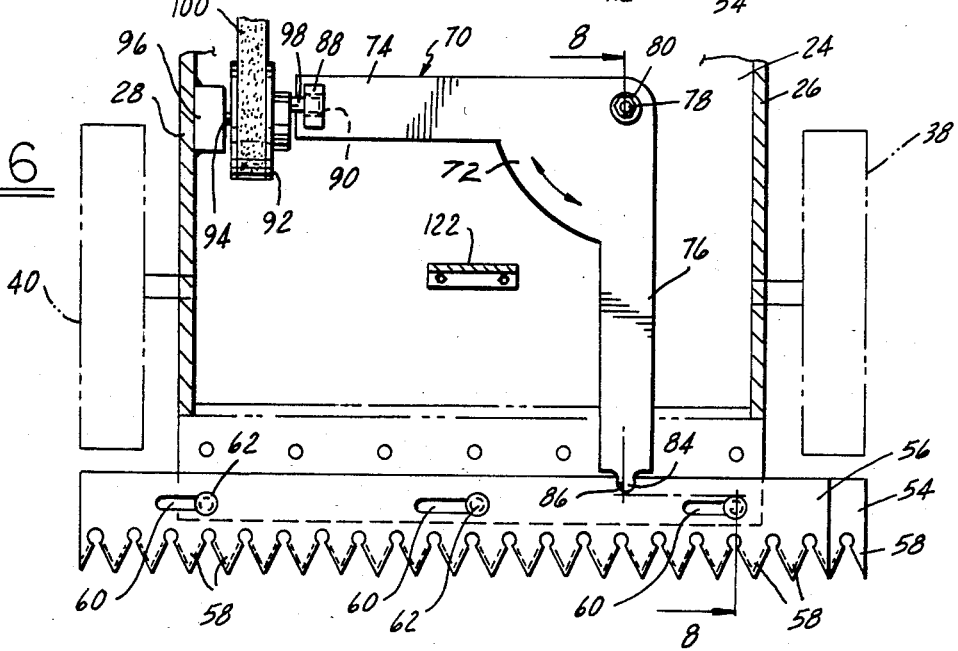

LAWNMOWER

The present invention is directed to lawnmowers, and more particularly to an improved lawnmower of a type having power driven mower blades.

This invention relates to the fact that over fifty thousand injuries are caused annually by lawnmowers. The more common rotary blade mowers are responsible for most injuries, while the reel type and the rare two wheel open front end blade mowers add to the total injuries. The purpose of the present invention is to provide a lawnmower featuring maximum safety not only for the operator, but for anyone else in the general area from flying objects. This is achieved by the introduction of a protective safety guard that completely surrounds the cutter blades, thereby preventing the operator or any foreign objects from accidental contact.

A general object of the present invention is to provide a lawnmower having power driven blades which is economical to manufacture, which may be readily repaired by the lawnmower owner, and which includes improved safety structure for preventing contact of the mower blades with rocks, tree trunks and human limbs.

Another object of the invention is to provide a lawnmower of the described character wherein lawn clippings are removed from the region of the cutting blades by a vacuum-type action.

The invention, together with additional objects, features and advantages thereof, will be best understood from the following description, the appended claims and the accompanying drawings in which:

Figure 2:
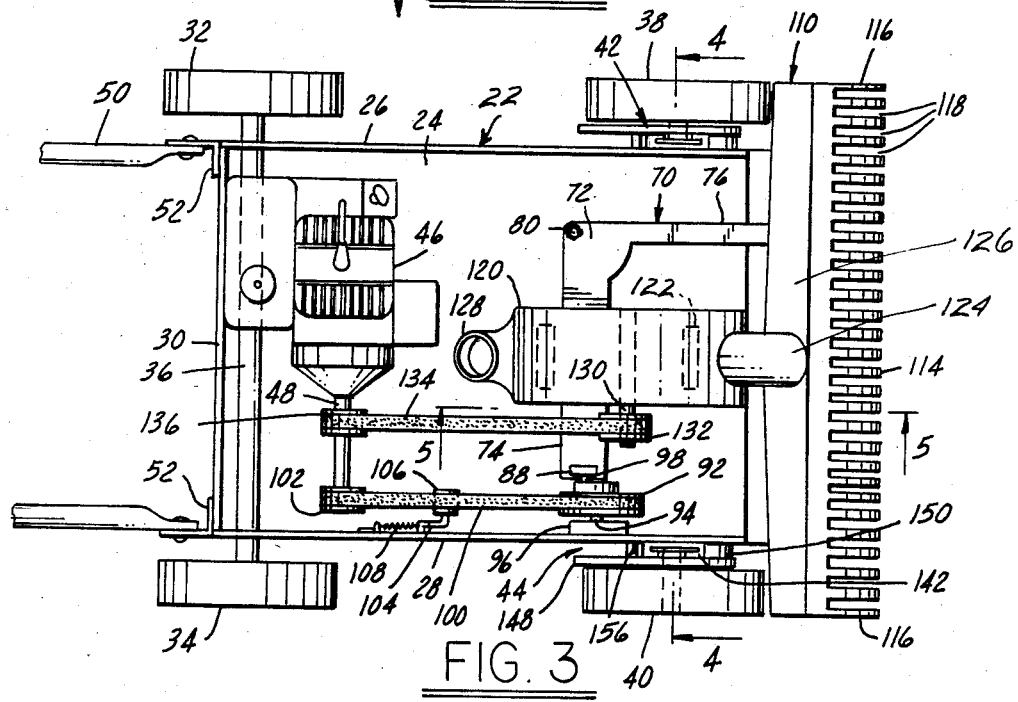
FIG. 2 is a top plan view of the lawnmower in FIG. 1.
Figure 3:
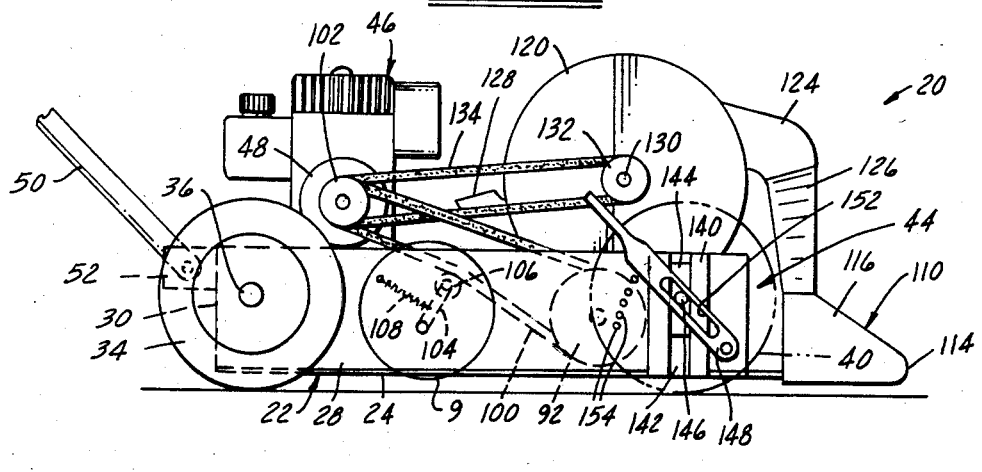
FIG. 3 is a side elevational view of the lawnmower of FIGS. 1 and 2 with one of the front wheels removed for illustrating the wheel adjustment mechanism.
Figure 7:
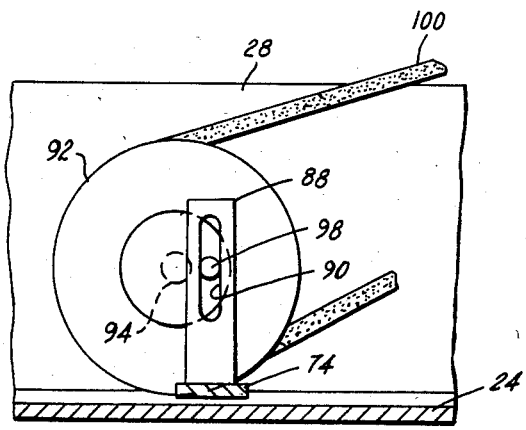
Figure 8:
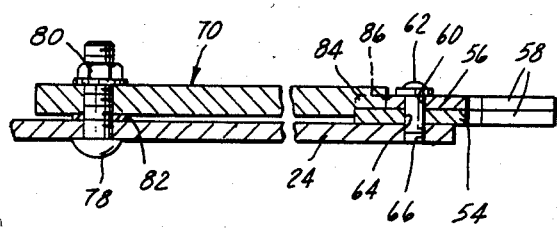
Figure 9:
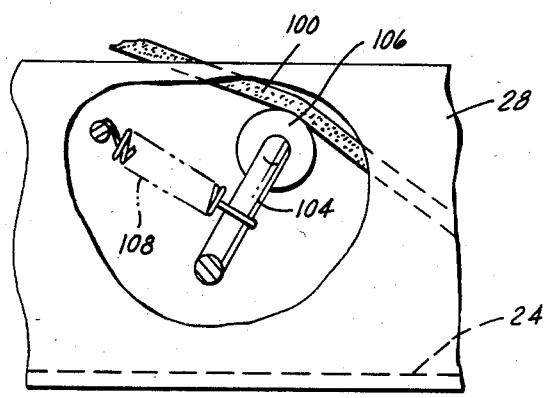

FIGS. 4 and 5 are sectional views taken substantially along the respective lines 4—4 and 5—5 in FIG. 2;

FIGS. 6 and 7 are sectional views taken substantially along the respective lines 6—6 and 7—7 in FIG. 4;

FIG. 8 is a sectional view taken substantially along the line 8—8 in FIG. 6; and FIG. 9 is a fragmentary partially sectioned view of the structure encircled by the line 9 in FIG. 3.

The drawings illustrate a preferred embodiment 20 of a lawnmower in accordance with the present invention as comprising a rectangular support base 22 having a flat deck 24 with integral walls 26, 28, 30 projecting upwardly from the side and rearward edges thereof. A pair of rear wheels 32, 34 are mounted at opposed ends of a rear axle 36 rotatably carried by and extending between side walls 26, 28 adjacent to the rearward edge of deck 24. A second pair of wheels 38, 40 are respectively mounted to deck side walls 26, 28 by associated adjustment assemblies 42, 44 adjacent to the forward edge of deck 24. A power source 46 is mounted on deck 24 adjacent to rear axle 36 and has a power drive shaft 48 projecting laterally therefrom parallel to rear axle 36. Power source 46 illustrated in the drawings comprises an internal combustion engine, although an electric motor may also be employed. An operator handle 50 is affixed to deck rear wall 30 by the brackets 52 (FIGS. 2 and 3). A modification not illustrated in the drawings contemplates a power take-off from engine driven shaft 48 to rear axle 38 for rendering mower 20 self-propelled in operation.

A pair of elongated mower blades 54, 56 (FIGS. 5, 6 and 8) are carried at the open forward edge of deck 24. Each blade 54, 56 comprises a flat plate having an equally spaced array of cutting teeth 58 projecting from a side edge thereof. As shown in the drawings, the teeth 58 of each blade 54, 56 are of generally triangular configuration as viewed from above, with the side edges of each tooth 58 being beveled to form a sharp cutting edge. Upper blade 56 has three longitudinally spaced and longitudinally extending slots 60. Blades 54, 56 are mounted to deck 24, with teeth projecting forwardly, by the screws 62 (FIGS. 6 and 8) which extend through slots 60 in blade 56 and through circular openings 64 (FIG. 8) in blade 54 into threaded openings 66 in deck 24. Openings 64 in blade 54 closely encompass screws 62, such that blade 54 is restrained by screws 62 against motion with respect to deck 24, while slots 60 in upper blade 56 permit lateral reciprocation of blade 56 with respect to blade 54 with the flat opposed surfaces of the blades 54, 56 in sliding engagement. Such lateral reciprocation results in a scissor action at the superimposed teeth 58 of the blades for clipping or cutting grass positioned among the blade teeth. The longitudinal dimensions of slots 60 is at least equal to the pitch of teeth 58.

A bell crank 70 has a flat central body 72 and a pair of orthogonally projecting coplanar arms 74, 76. Body 72 of bell crank 70 is mounted to deck 24 by a screw 78 and a nut 80 for pivotal motion about the axis of screw 78 in a plane parallel to deck 24 and to the direction of reciprocation of blade 56 over blade 54. A bearing 82 is positioned between bell crank body 72 and deck 24 surrounding screw 78 to facilitate such pivotal motion. A rounded finger 84 (FIGS. 6 and 8) longitudinally outwardly projecting from the body-remote end of bell crank arm 76 is received in a corresponding opening 86 on the tooth-remote side edge of blade 56. A block 88 is carried at and projects upwardly from the body-remote end of bell crank arm 74, and has a longitudinally upwardly oriented slot 90 (FIGS. 4, 6 and 7) formed therein. A pulley 92 is carried by a shaft 94 rotatable in a bearing housing 96 which is externally affixed to deck side wall 28 adjacent to the free end of bell crank arm 74. A pin 98 projects from pulley 92 parallel to and offset from the axis of rotation thereof into slot 90 of block 88. Pulley 92 is coupled by a belt 100 to a pulley 102 (FIGS. 1 and 2) affixed to drive shaft 48.

An arm 104 (FIGS. 2, 3 and 9) is pivotally mounted at one end internally of deck side wall 28 and has an idler roller 106 rotatably carried at the opposing end. A coil spring 108 is affixed at one end to deck side wall 28 and engages arm 104 at the opposing end for biasing arm 104 and roller 106 into tensioning engagement with drive belt 100. Thus, rotation of engine drive shaft 48 is transmitted by pulley 102 and belt 100 to pulley 92 causing eccentric rotation of pin 98 about the axis of pulley 92. Such eccentric motion of pin 98 results in linear translation thereof in slot 90 of block 88 and reciprocating motion of block 98 about the axis of bell crank mounting screw 78. Such reciprocation is transmitted by bell crank 72 to blade 56 causing linear reciprocation thereof over fixed blade 54. Thus, the combination of pin 98 and block 88 comprises a pitman drive mechanism for translating rotary output of engine drive shaft 48 to reciprocating motion of bell crank 70 and blade 56. It will be appreciated that offset of pin 98 with respect to the axis of pulley 92 is coordinated with the lengths of bell crank arms 74, 76 so as to obtain reciprocation of blade 56 over a distance at least equal to the pitch of teeth 58.

Figure 1:
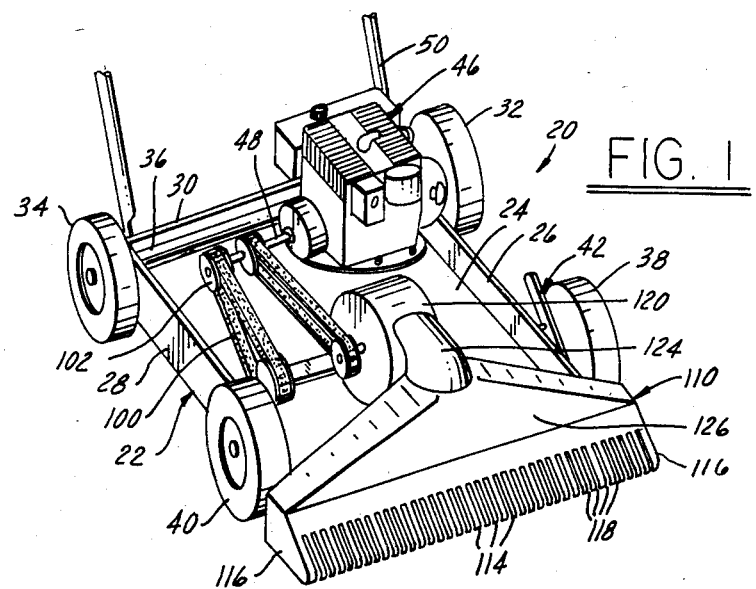
FIG. 1 is a fragmentary perspective view of a lawnmower in accordance with a presently preferred embodiment of the invention.

A guard housing or shell 110 of sheet metal or plastic construction is affixed by the screws 112 (FIG. 5) beneath the forward edge of deck 24 so as to enclose blades 54, 56. As best seen in FIGS. 3 and 5, the cross section contour of guard shell 110 tapers narrowingly in the forward direction to a rounded forward nose 114. Shell 110 has solid side walls 116 (FIGS. 1-3). A plurality of vertical slots or apertures 118 are formed in the forward wall of shell 110 and extend rearwardly from nose 114 past teeth 58 of blades 54, 56. Slots 118 are dimensioned laterally of shell 110 so as to permit entry of grass blades while preventing entry of stones, tree trunks and human fingers and legs, etc. Thus, shell 10 functions to "comb" the grass and to guide grass blades among mower blade teeth 58, while preventing entry of stones and human limbs. A blower 120 is mounted above deck 24 by a pair of brackets 122. Blower 120 has an input mouth 124 which is connected by a downwardly flaring neck 126 to shell 110. An output mouth 128 of blower 120 is adapted for connection to a suitable receptacle (not shown) for receiving grass clippings. Blower 120 has a drive shaft 130 on which a pulley 132 is mounted. Pulley 132 is coupled by a belt 134 to a pulley 136 on engine drive shaft 48 for driving blower 120. Blower 120 thereby causes a negative pressure within shell 110, which not only enhances the combing action thereof in positioning grass blades for cutting, but also removes grass clippings from within shell 110 surrounding blades 54, 56. The blades of blower 120, as well as the surrounding shell thereof, may be equipped with suitable wear plates (not shown) for mulching such grass clippings.

Wheel adjustment assembly 44 is illustrated in FIGS. 2 and 3 as comprising a bracket 140 affixed to the external surface of deck side wall 28 adjacent to the forward end thereof and having a pair of opposed fingers which form a vertical slot 142 in bracket 140. A plate 144 is carried for vertical sliding motion within slot 142 of bracket 140. A shaft 146 is affixed to and projects laterally outwardly from plate 144, with wheel 40 being rotatably mounted on shaft 146. A level adjustment arm 148 is pivotally mounted by the spacer 150 (FIG. 2) to the external surface of deck side wall 28 forwardly of bracket 140. A longitudinal slot 152 in arm 148 slidably embraces shaft 146. A plurality of detent openings 154 (FIG. 3) are formed in deck side wall 28 in an arcuate array at constant radius from spacer 150 for selectively receiving a pin 156 which projects inwardly from arm 148. Arm 148 may thus be selectedly positioned angularly of the axis of spacer 150 for adjusting the vertical position of shaft 146, and thus the axis of rotation of wheel 40. Wheel adjustment assembly 42 (FIGS. 1 and 2) is the mirror image of adjustment assembly 44 and is laterally aligned therewith. Thus, conjoint adjustment of assemblies 42, 44 selectively adjusts the cutting height of mower blades 54, 56.

Pitman drive 88-98 may be replaced by or supplemented with suitable cams, if desired.

The invention claimed is:

I claim:

1. A lawnmower comprising a support base including a deck, a plurality of wheels and means rotatably mounting said wheels to said deck for carrying said deck over the ground; a power source mounted on said deck; mower means including a pair of elongated mower blades each having a plurality of outwardly projecting blade teeth along one side thereof, means mounting one of said blades in fixed position along a forward edge of said deck with teeth projecting forwardly, means mounting the other of said blades with teeth projecting forwarding adjacent to said one blade for lateral reciprocation with respect thereto, and means coupling said other blade to said power source for reciprocating said other blade to scissor blades of grass positioned among said teeth; a closed blade guard housing carried by said deck along said forward edge and enclosing said blades, said blade guard housing having a lateral array of forwardly opening vertical slots in a forward wall of said housing positioned in front of said blades for receiving and guiding grass to said blades; and a blower having an inlet coupled to said closed guard housing and means coupling said blower to said power source for removing grass clippings from within said closed housing.

2. The lawnmower set forth in claim 1 wherein said power source has a rotary output shaft, and wherein said means coupling said other blade to said power source comprises means for translating rotary output of said shaft into linear reciprocation of said other blade laterally of said one blade.

3. The lawnmower set forth in claim 2 wherein said translating means comprises pitman drive means.

4. The lawnmower set forth in claim 3 wherein said pitman drive means comprises a bell crank, means mounting a central portion of said bell crank to said deck for pivotal motion in a plane parallel to reciprocation of said other blade, means coupling one arm of said bell crank to said other blade, and eccentric drive means coupling the other arm of said bell crank to said output shaft.

5. The lawnmower set forth in claim 4 wherein said eccentric drive means comprises a pin mounted for rotation to said shaft and offset from the axis thereof, and a block carried by said other arm of said bell crank having a slot into which said pin is slidably received.

6. The lawnmower set forth in claim 1 wherein said wheels comprise pairs of opposed wheels positioned adjacent to forward and rear edges of said deck, and wherein said means rotatably mounting wheels to said deck comprises means for adjustably positioning the wheel pair adjacent to said forward deck edge with respect to said deck for adjusting cutting level of said blades.

7. The lawnmower set forth in claim 6 wherein said adjustably positioning means comprises a bracket affixed to each opposed lateral side of said deck adjacent to said forward edge, a plate slidably carried in each said bracket, a shaft mounted to and projecting outwardly from each said plate, with a wheel being rotatably carried on each said shaft, a pair of adjustment arms each mounted at one end to said deck for rotation about an adjustment axis, each said arm having a longitudinal slot into which a shaft is slidably received, a plurality of detent means positioned in an arc on each side of said deck spaced from and at fixed radius to a corresponding adjustment axis, and means on each said arm for selectively engaging said detent means.

8. A lawnmower comprising a support base including a deck, four wheels and means rotatably mounting said wheels in laterally opposed pairs adjacent to forward and rearward edges of said deck; a power source mounted on said deck; mower means including a pair of elongated linear mower blades extending along said forward edge of said deck and each having a plurality of blade teeth projecting forwardly of said deck, means mounting one of said blades in fixed position to said deck, means mounting the other of said blades for lateral reciprocation adjacent to said one blade such that said teeth of said blade scissor with respect to each other, and means coupling said other blade to said power source for reciprocating said other blade; a blade guard housing carried by said deck along said forward edge of said deck and enclosing said blades, said blade guard housing having closed back, bottom and side walls, a front wall and a top wall, an array of vertical slot openings spaced laterally of said deck in said front wall of said housing for admitting and conducting grass to said blades; and a blower having an inlet coupled to an opening in said top wall of said guard housing and means coupling said blower to said power source for drawing grass clippings from within said housing.

9. The lawnmower set forth in claim 8 wherein said guard housing has a lateral cross section which tapers narrowingly forwardly, said front wall having a rounded nose, said slots extending vertically through said front and bottom walls, said blade teeth projecting forwardly into said nose with said slots extending rearwardly past said teeth.

10. The lawnmower set forth in claim 9 wherein said power source has a rotary output shaft, and wherein said means coupling said other blade to said power source comprises means for translating rotary output of said shaft into linear reciprocation of said other blade laterally of said one blade.

11. The lawnmower set forth in claim 10 wherein said translating means comprises a bell crank, means mounting a central portion of said bell crank to said deck for pivotal motion in a plane parallel to reciprocation of said other blade, means coupling one arm of said bell crank to said other blade, and eccentric drive means coupling the other arm of said bell crank to said output shaft.

12. The lawnmower set forth in claim 11 wherein said means rotatably mounting said wheels adjacent to said forward deck edge comprises a bracket affixed to each opposed lateral side of said deck adjacent to said forward edge, a plate slidably carried in each said bracket, a shaft mounted to and projecting outwardly from each said plate, with a wheel being rotatably carried on each said shaft, a pair of adjustment arms each mounted at one end to said deck for rotation about an adjustment axis, each said arm having a longitudinal slot into which a shaft is slidably received, a plurality of detent means positioned in an arc on each side of said deck spaced from and at fixed radius to a corresponding adjustment axis, and means on each said arm for selectively engaging said detent means.

* * * * *